United States Patent
Kondou

(10) Patent No.: US 7,749,314 B2
(45) Date of Patent: Jul. 6, 2010

(54) PARTICULATE MATTER ACCUMULATION AMOUNT DETECTION APPARATUS AND METHOD

(75) Inventor: Terunori Kondou, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 606 days.

(21) Appl. No.: 11/675,362

(22) Filed: Feb. 15, 2007

(65) Prior Publication Data

US 2007/0209333 A1    Sep. 13, 2007

(30) Foreign Application Priority Data

Mar. 7, 2006   (JP) .............................. 2006-061317
Jan. 26, 2007  (JP) .............................. 2007-016580

(51) Int. Cl.
*B01D 41/00* (2006.01)

(52) U.S. Cl. .............................. 96/421; 96/417; 96/422; 55/282.3; 55/523; 55/DIG. 34; 95/8; 95/11

(58) Field of Classification Search ................... 96/113, 96/114, 417, 421, 422; 60/274, 277, 295, 60/311; 55/282.3, 523, DIG. 34; 95/8, 11, 95/15, 18, 148, 276
See application file for complete search history.

(56) References Cited

U.S. PATENT DOCUMENTS

| 6,405,528 B1 * | 6/2002 | Christen et al. | 60/295 |
| 6,622,480 B2 * | 9/2003 | Tashiro et al. | 60/295 |
| 6,952,920 B2 * | 10/2005 | Shirakawa | 60/311 |
| 2005/0109028 A1 * | 5/2005 | Shirakawa et al. | 60/602 |
| 2006/0191256 A1 * | 8/2006 | Colignon | 60/295 |
| 2007/0119128 A1 * | 5/2007 | Tochikawa et al. | 55/282.3 |

FOREIGN PATENT DOCUMENTS

| JP | 2002-97930 | 4/2002 |
| JP | 2002-242660 | 8/2002 |
| JP | 2004-211650 | 7/2004 |
| WO | WO 2005049986 A1 * | 6/2005 |

\* cited by examiner

*Primary Examiner*—Robert J Hill, Jr.
*Assistant Examiner*—Christopher P Jones
(74) *Attorney, Agent, or Firm*—Global IP Counselors, LLP

(57) ABSTRACT

A particulate matter accumulation amount detection apparatus includes a filter pressure loss detecting section, an incombustible component amount estimating section, an incombustible component accumulation state estimating section, and a particulate accumulation amount detecting section. The filter pressure loss detecting section is configured to detect an upstream-downstream differential pressure of an exhaust gas purification filter having a plurality of substrate walls. The incombustible component amount estimating section is configured to estimate an amount of an incombustible component. The incombustible component accumulation state estimating section is configured to estimate an accumulation state of the incombustible component on the substrate walls based on the engine operating state and the amount of the incombustible component. The particulate accumulation amount detecting section is configured to detect an amount of the particulate matter accumulated in the exhaust gas purification filter based on the upstream-downstream differential pressure and the accumulation state of the incombustible component.

14 Claims, 14 Drawing Sheets

US 7,749,314 B2

PARTICULATE MATTER ACCUMULATION AMOUNT DETECTION APPARATUS AND METHOD

CROSS-REFERENCE TO RELATED APPLICATIONS

This application claims priority to Japanese Patent Application No. 2006-061317 filed on Mar. 7, 2006 and Japanese Patent Application No. 2007-016580 filed on Jan. 26, 2007. The entire disclosures of Japanese Patent Application Nos. 2006-061317 and 2007-016580 are hereby incorporated herein by reference.

BACKGROUND OF THE INVENTION

1. Field of the Invention

The present invention relates to a particulate matter accumulation amount detection apparatus and method configured and arranged to estimate an amount of particulates accumulated in an exhaust gas purification filter that is configured and arranged to trap the particulates that are contained in exhaust gas discharged from an engine to prevent the particulates from being discharged to the atmosphere.

2. Background Information

Japanese Laid-Open Patent Application Publication No. 2002-97930 discloses a conventional exhaust gas purification device for a diesel engine in which a diesel particulate filter (hereinafter referred as "DPF") is installed in an exhaust passage of the diesel engine. The DPF is configured and arranged to purify exhaust gas discharged from the diesel engine by trapping particulate matter (hereinafter referred as "PM") in the exhaust gas. As the DPF continues to trap PM, the DPF eventually becomes clogged. Accordingly, the conventional exhaust gas purification device is configured to regenerate the DPF by raising the temperature of the exhaust gas to forcibly burn off, and thus, eliminate the accumulated PM in the DPF when it is determined that PM has accumulated in the DPF over a certain level.

The conventional exhaust gas purification device as disclosed in the above mentioned reference is configured to determine whether PM has accumulated in the DFP to an extent that necessitates the regeneration of the DPF based on a differential pressure (upstream-downstream differential pressure) between inlet and outlet of the DPF.

In view of the above, it will be apparent to those skilled in the art from this disclosure that there exists a need for an improved particulate matter accumulation amount detection apparatus and method. This invention addresses this need in the art as well as other needs, which will become apparent to those skilled in the art from this disclosure.

SUMMARY OF THE INVENTION

With the conventional exhaust gas purification device as mentioned above, the amount of PM accumulated in the DPF may not be accurately estimated depending on the engine operating state, and thus, the DPF regeneration timing may not be accurately determined.

The present invention is conceived in view of the above problems in the conventional art, and one object of the present invention is to provide a particulate matter accumulation amount detection apparatus and method that accurately detects an accumulation amount of particulate matter in an exhaust gas purification filter, and to accurately determine a DPF regeneration timing.

In order to achieve the above mentioned object of the present invention, a particulate matter accumulation amount detection apparatus includes a filter pressure loss detecting section, an incombustible component amount estimating section, an incombustible component accumulation state estimating section, and a particulate accumulation amount detecting section. The filter pressure loss detecting section is configured and arranged to detect an upstream-downstream differential pressure of an exhaust gas purification filter having a plurality of substrate walls that filter particulate matter in exhaust gas from an engine to prevent the particulate matter from being discharged into the atmosphere. The incombustible component amount estimating section is configured to estimate an amount of an incombustible component included in the exhaust gas. The incombustible component accumulation state estimating section is configured to estimate an accumulation state of the incombustible component on the substrate walls of the exhaust gas purification filter based on the engine operating state and the amount of the incombustible component estimated in the incombustible component amount estimating section. The particulate accumulation amount detecting section is configured to detect an amount of the particulate matter accumulated in the exhaust gas purification filter based on the upstream-downstream differential pressure of the exhaust gas purification filter and the accumulation state of the incombustible component on the substrate walls.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 to 4, a basic idea behind the present invention will be explained in order to facilitate understanding of the present invention.

Figure 1:
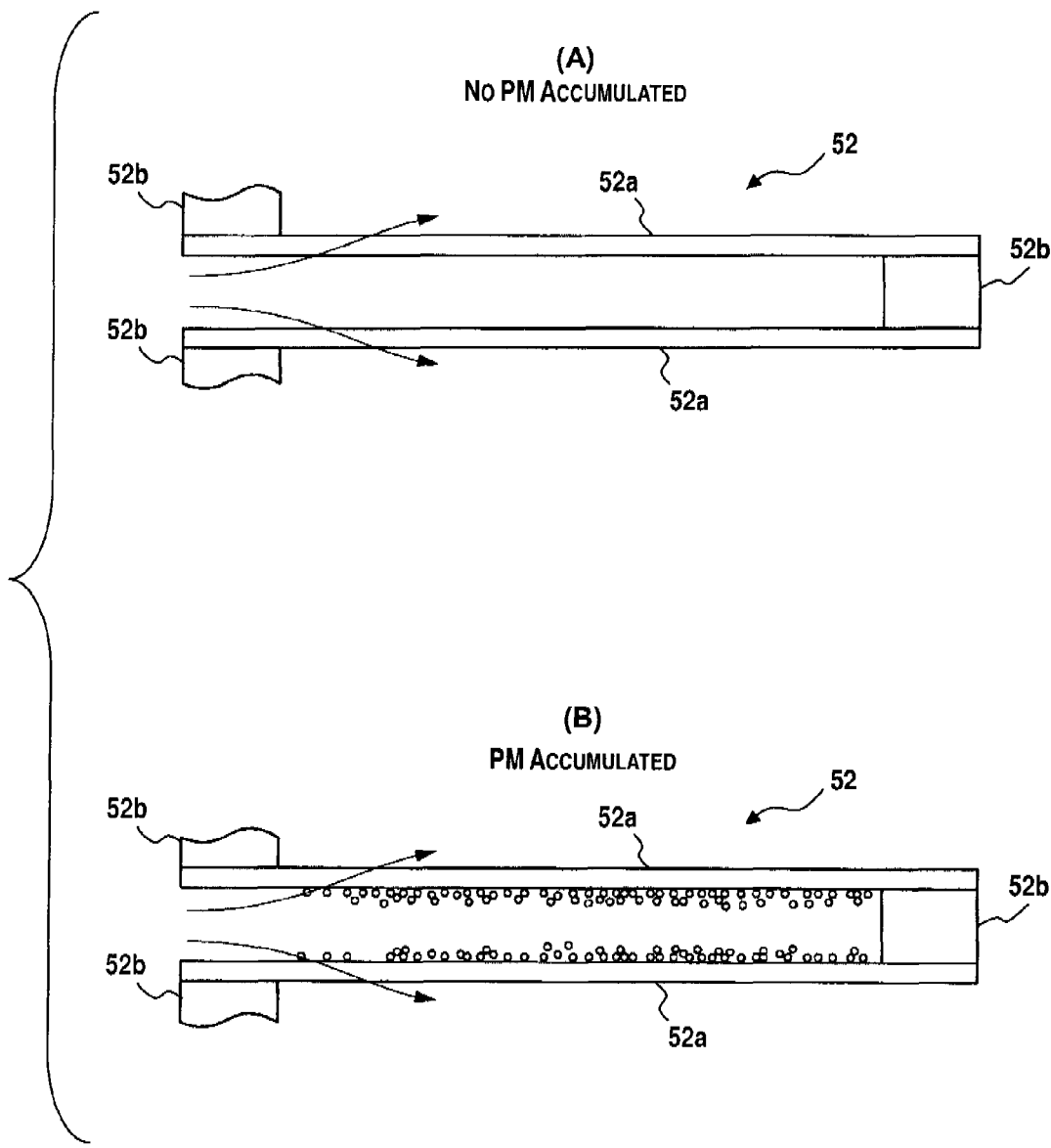
FIG. 1 is a pair of diagrams (A) and (B) illustrating a schematic partial cross sectional view of a DPF, wherein the diagram (A) illustrates a state in which no PM is accumulated in the DPF and the diagram (B) illustrates a state in which PM is accumulated in the DPF.

FIG. 1 is a pair of diagrams (A) and (B) illustrating a schematic partial cross sectional view of a diesel particulate filter (DPF) 52. The diagram (A) of FIG. 1 illustrates a state in which no particulate matter (PM) is accumulated in the DPF 52 and the diagram (B) illustrates a state in which PM is accumulated in the DPF 52. In addition, the arrows in the diagrams (A) and (B) in FIG. 1 indicate the exhaust gas flows.

The DPF 52 has, for example, a porous honeycomb structure that is made of a ceramic, such as cordierite. The DPF 52 is partitioned by a plurality of porous thin walls 52a (substrate walls or carrier walls) to create a lattice of passageways inside the DPF 52. As shown in the diagrams (A) and (B) of FIG. 1, the entrances of the passageways are alternately sealed by a plurality of sealing members 52b. More specifically, a passageway in which the entrance is not sealed is sealed at the exit by the sealing member 52b. The exhaust gas that flows into the DPF 52 passes through the porous thin walls 52a, which partition the passageways. Then, the exhaust gas is discharged downstream of the DPF 52, as shown by the arrows in the diagrams (A) and (B) of FIG. 1.

In a conventional method, a DPF regeneration timing for regenerating the DPF 52 to burn PM accumulated in the DPF 52 is determined by estimating a PM accumulation state of the DPF 52 based on a DPF pressure loss (pressure drop) $\Delta P$.

More specifically, the pressure loss $\Delta P_{wall}$ caused by the DPF substrate (the porous thin walls 52a) of the DPF 52 when PM is not accumulated in the DPF 52 (e.g., a state shown in the diagram (A) of FIG. 1) is expressed by the equation (1) below.

$$\Delta P_{wall} = k_1 \mu Q + k_2 \rho Q^2 \qquad \text{Equation (1)}$$

$\Delta P_{wall}$: Pressure loss caused by the DPF substrate (porous thin walls)
Q: Gas flow volume
$\mu$: Exhaust gas viscosity
$\rho$: Exhaust gas density
$k_1$, $k_2$: Constants In the equation (1), the first term on the right side ($k_1 \mu Q$) represents the pressure loss that is caused by pipe friction, and the second term ($k_2 \rho Q^2$) represents the pressure loss that is caused by a change in speed.

On the other hand, the pressure loss $\Delta P_{pm}$ that is caused by the accumulation of PM in the DPF 52 when PM has accumulated on the DPF substrate is expressed by the equation (2) below.

$$\Delta P_{pm} = (k_3 \mu Q + k_4 \rho Q^2) \times M_{pm} \qquad \text{Equation (2)}$$

$\Delta P_{pm}$: Pressure loss caused by the accumulation of PM
$M_{pm}$: PM accumulation amount
Q: Gas flow volume
$\mu$: Exhaust gas viscosity
$\rho$: Exhaust gas density
$k_3$, $k_4$: Constants Accordingly, the pressure loss $\Delta P$ of the DPF 52 when PM has accumulated in the DPF 52 is expressed by the equation (3) below.

$$\begin{aligned}\Delta P &= \Delta P_{wall} + \Delta P_{pm} \\ &= (k_1 \mu Q + k_2 \rho Q^2) + (k_3 \mu Q + k_4 \rho Q^2) \times M_{pm}\end{aligned} \qquad \text{Equation (3)}$$

Therefore, the equation (4) below is derived from the equation (3).

$$M_{pm} = \frac{\Delta P - k_1 \mu Q - k_2 \rho Q^2}{k_3 \mu Q + k_4 \rho Q^2} \qquad \text{Equation (4)}$$

Accordingly, the PM accumulation amount $M_{pm}$ accumulated in the DPF 52 is calculated using the equation (4) above based on the DPF pressure loss $\Delta P$.

However, depending on the engine operating state, the PM accumulation amount determined by the conventional method discussed above may be inaccurate. The inaccuracy in the estimated PM accumulation amount is caused by the effects of incombustible components, e.g., impurities from engine oil additives, such as ash.

Figure 2:
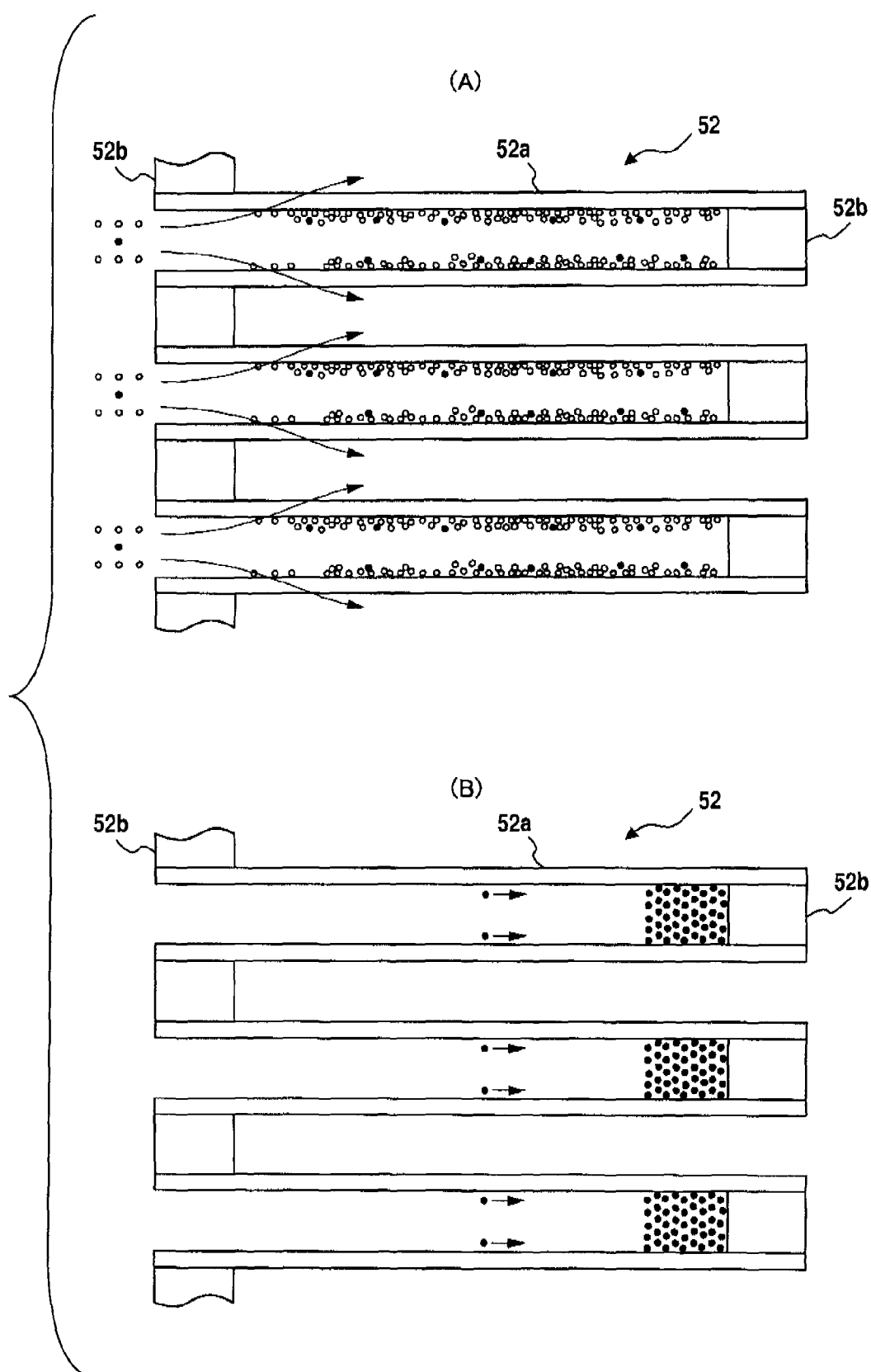
FIG. 2 is a pair of diagrams (A) and (B) illustrating a schematic partial cross sectional view of the DPF, wherein the diagram (A) illustrates a state in which PM and ash are accumulated in the DPF and the diagram (B) illustrates a state in which the DPF has been regenerated during normal operation of an engine.
Figure 3:
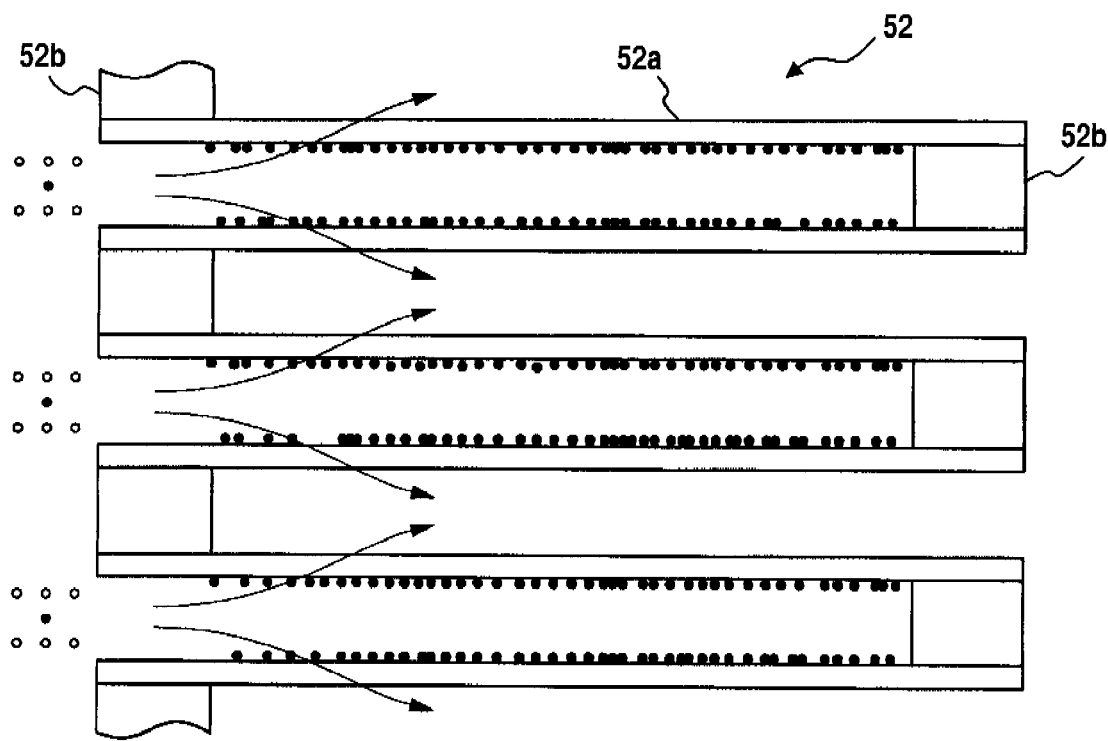
FIG. 3 is a schematic partial cross sectional view of the DPF illustrating a state in which ash is accumulated in the DPF when the engine is operated under high speed travel condition.
Figure 4:
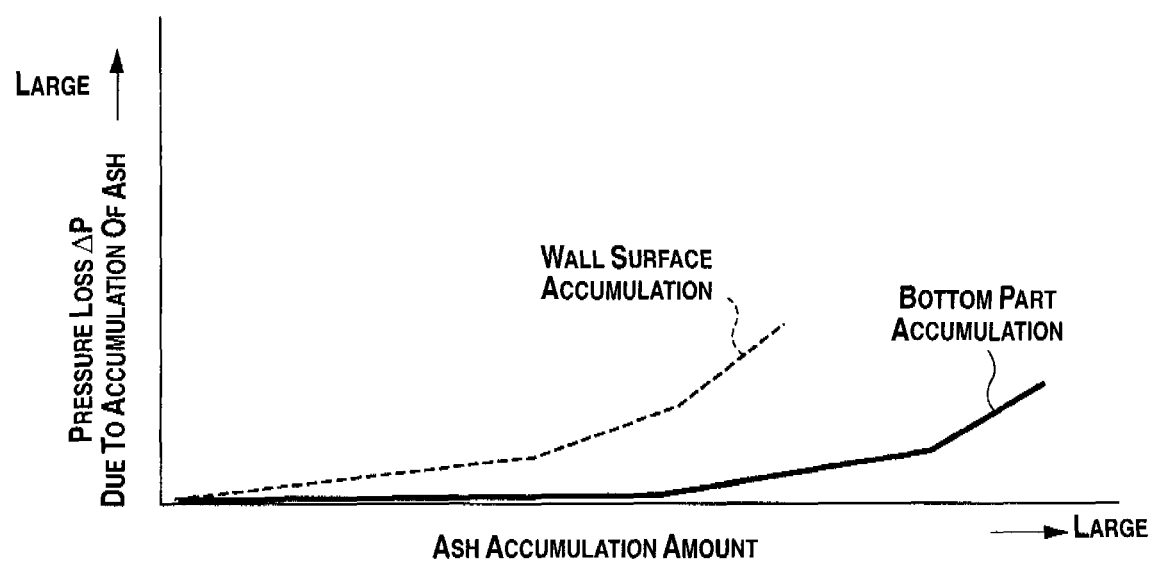
FIG. 4 is a schematic diagram illustrating a relationship between the ash accumulation amount in the DPF and the upstream-downstream differential pressure (pressure loss) of the DPF.

Referring now to FIGS. 2 to 4, the accumulation state of ash accumulated in the DPF 52 and the effects of the accumulated ash in estimating the PM accumulation amount will now be discussed in detail. FIG. 2 is a pair of diagrams (A) and (B) illustrating a schematic partial cross sectional view of the DPF 52, wherein the diagram (A) illustrates a state in which PM and ash are accumulated in the DPF 52 and the diagram (B) illustrates a state in which the DPF 52 has been regenerated during normal operation of an engine. FIG. 3 is a schematic partial cross sectional view of the DPF 52 illustrating a state in which ash is accumulated in the DPF 52 when the average speed of the engine is higher than the normal operation of the engine under high speed travel condition. FIG. 4 is a schematic diagram illustrating a relationship between the ash accumulation amount in the DPF 52 and the DPF pressure loss ΔP. In the diagrams (A) and (B) of FIG. 2 and FIG. 3, PM is indicated by white circles and ash is indicated by black circles.

During normal operation of the engine, PM contained in the exhaust gas is trapped by and accumulated on inner side surfaces of the porous thin walls 52$a$, as shown in the diagram (A) of FIG. 2. In addition, ash accumulates on the porous thin walls 52$a$ along with the PM. Moreover, although some of the trapped PM is burned off during the normal operation of the engine, the amount of PM that is burned off is small unless the temperature (bed temperature) of the DPF 52 is high. Therefore, the amount of the PM accumulated in the DPF 52 is greater than the amount that is burned off during the normal operation of the engine. If this state continues and the DPF 52 continues to trap PM in the exhaust gas, then the DPF 52 will eventually become clogged. Accordingly, the exhaust gas temperature is raised when the PM has accumulated over a certain level to forcibly burn off and thereby eliminate the accumulated PM in the DPF 52.

However, ash accumulated in the DPF 52 does not burn off even if the exhaust gas temperature is raised and the accumulated PM is burned off. When the accumulated PM is burned off, ash in the DPF 52 accumulates in a downstream part (bottom part) of the DPF 52, as shown in the diagram (B) of FIG. 2, due to the flow of gas during burning off of the accumulated PM. The accumulated ash in the DPF 52 clogs the porous thin walls 52$a$ and increases the DPF pressure loss ΔP.

On the other hand, the temperature of both the exhaust gas and the DPF 52 (bed temperature) are high during high speed travel. In such high speed travel state, if PM contained in the exhaust gas is trapped by the inner side surfaces of the porous thin walls 52$a$ of the DPF 52, then PM will naturally burn off (naturally regenerate) without accumulating in the DPF 52. However, the ash trapped in the DPF 52 will not burn off even if the temperature of the exhaust gas is high during high speed travel. Consequently, as shown in FIG. 3, the ash spreads over the inner side surfaces of the porous thin walls 52$a$, and thus, the ash clogs the porous thin walls 52. Therefore, the DPF pressure loss ΔP is increased.

Accordingly, the ash accumulation state when the accumulated PM in the DPF 52 was forcibly burned off during regeneration of the DPF 52 is different from the ash accumulation state when PM burned off naturally as a result of the increase in the exhaust gas temperature due to, for example, high speed travel. More specifically, the ash spreads over the inner side surfaces of the porous thin walls 52$a$ more when the PM burned off naturally during high speed travel (FIG. 3) than when the PM was forcibly burned off during regeneration of the DPF 52 (the diagram (B) of FIG. 2). In other words, the ash accumulates in a substantially large area of the inner side surfaces of the porous thin walls 52$a$ (wall surface accumulation state) when the PM burned off naturally during high speed travel as shown in FIG. 3, while the ash accumulates at the downstream (bottom) part of the DPF 52 (bottom part accumulation state) when the PM was forcibly burned off during regeneration of the DPF 52 as shown in the diagram (B) of FIG. 2. As a result, even though the amount of ash accumulated in the DPF 52 was the same, the DPF pressure loss ΔP is different between the wall surface accumulation state and the bottom part accumulation state as shown in FIG. 4. Consequently, if the DPF regeneration timing was determined based solely on the DPF pressure loss ΔP (upstream-downstream differential pressure), depending on the ash accumulation state (e.g., the wall surface accumulation state or the bottom part accumulation state), the DPF regeneration timing may be inaccurately determined.

Accordingly, the particulate matter accumulation amount detection apparatus of the present invention is configured and arranged to estimate a PM accumulation amount in accordance with an ash clogged surface area indicative of a surface area of the porous thin walls 52$a$ of the DPF 52 through which the exhaust gas does not pass as a result of accumulation of the ash. More specifically, a physical quantity, which is referred to as a filtration surface area percentage $R_{fa}$, is determined to estimate the PM accumulation amount in the present invention. As used herein, the filtration surface area percentage $R_{fa}$ indicates the percentage of the surface area of the DPF 52 through which the exhaust gas can pass without being blocked by the ash, i.e., the percentage of the surface area that can filter PM in the exhaust gas. In calculating the PM accumulation amount in accordance with the present invention, values of first to fourth PM accumulation estimate coefficients that correspond to the constants $k_1$-$k_4$ in the equation (4) above are varied in accordance with the filtration surface area percentage $R_{fa}$ such that the smaller the filtration surface area percentage $R_{fa}$ (i.e., the more the clogged surface area spreads due to ash) is, the smaller the PM accumulation amount becomes. Furthermore, the extent to which the first to fourth PM accumulation estimate coefficients are varied is preferably set empirically.

Figure 5:
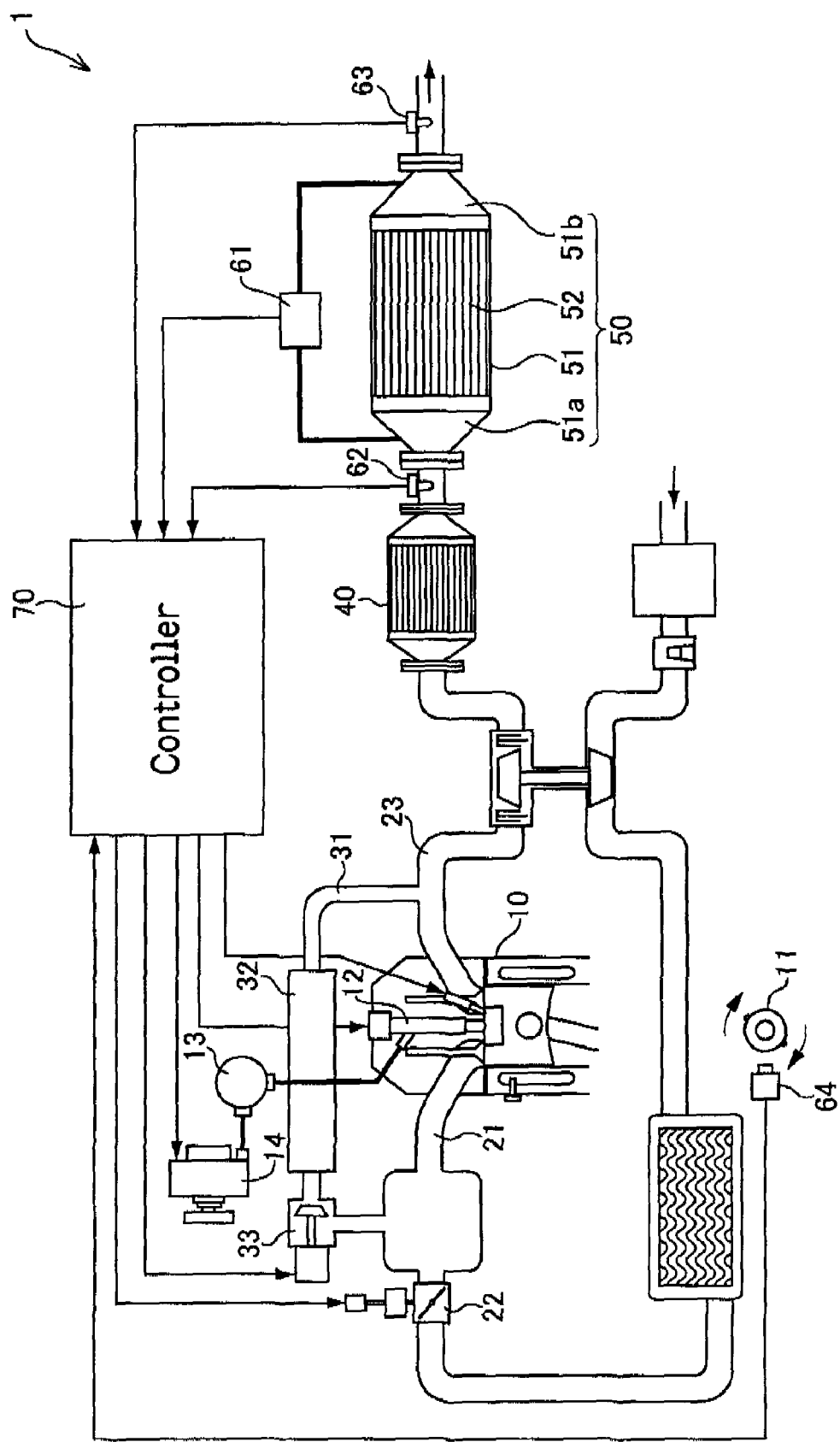
FIG. 5 is an overall system diagram of an engine provided with a particulate matter accumulation amount detection apparatus in accordance with a first embodiment of the present invention.

Referring now to FIG. 5, the particulate matter accumulation amount detection apparatus and method is illustrated in accordance with a first embodiment of the present invention that adapts the basic idea behind the present invention discussed above.

FIG. 5 is an overall system diagram of an engine 10 provided with a particulate matter accumulation amount detection apparatus in accordance with the first embodiment. As shown in FIG. 5, a vehicle engine system 1 includes the engine 10, an intake passageway 21, a throttle valve 22, an exhaust gas passageway 23, an EGR passageway 31, an EGR cooler 32, an EGR valve 33, a diesel oxidative catalyst (hereafter "DOC") 40, a DPF assembly 50, a differential pressure sensor 61 (filter pressure loss detecting section), a DPF inlet temperature sensor 62, a DPF outlet temperature sensor 63, a crank angle sensor 64 and a controller 70. The EGR passageway 31, the EGR cooler 32, and the EGR valve 33 together constitute an exhaust gas recirculation apparatus (hereinafter referred as an "EGR apparatus"). The EGR apparatus, the diesel oxidative catalyst 40, the DPF assembly 50 and the controller 70 together constitute an exhaust gas system.

The engine 10 is preferably a diesel engine that includes a crank shaft 11, an injector 12, a common rail 13 and a high pressure pump 14. In the engine 10, the fuel that has been momentarily pressurized is injected from the injector 12 to the common rail 13. The pressure of the common rail 13 is increased by the high pressure pump 14, in accordance with the injection timing.

The exhaust gas discharged from the diesel engine 10 partially flows back to the intake passageway 21 via the EGR apparatus. The EGR cooler 32 is configured and arranged to cool the exhaust gas that flows back from the exhaust gas passageway 23. The amount of EGR is adjusted by opening and closing the EGR valve 33. The controller 70 is configured to control the duty cycle of the EGR valve 33.

As seen in FIG. 5, the DOC 40 is provided to the exhaust gas passageway 23 of the diesel engine 10. The DOC 40 is configured and arranged to reduce the amount of PM by the oxidizing function of a catalyst that is supported on a noble metal, such as palladium and platinum. When unburned components (hydrocarbons, HC) flow into the DOC 40, a catalytic reaction causes the exhaust gas, which has reached a high temperature, to flow out from the DOC 40.

The DPF assembly 50 is disposed downstream of the DOC 40. The DPF assembly 50 includes a DPF housing 51 and the DPF 52 (diesel particulate filter). The DPF housing 51 includes an upstream chamber 51a and a downstream chamber 51b, and the DPF 52 is built-in to the DPF housing 51 between the upstream and downstream chambers 51a and 51b. The DPF 52 has a porous honeycomb structure and is made of a ceramic, such as cordierite. The DPF 52 has a lattice of passageways, which are partitioned by the porous thin walls 52a (substrate walls) as shown in FIGS. 1 to 3. The entrances of alternate passageways are sealed by the sealing members 52b such that the passageways for which the entrances are not sealed have their exits sealed (FIGS. 1 to 3). The exhaust gas that flows into the DPF 52 passes through the porous thin walls 52a, which partition the passageways, and is discharged downstream of the DPF 52. The PM contained in the exhaust gas is trapped by and accumulates on the inner side surfaces of the porous thin walls 52a. Although some of the trapped PM is burned off in the DPF 52, the burn off amount is small unless the DPF temperature (bed temperature) is high. Therefore, the amount of PM that is accumulated in the DPF 52 is greater than the amount of PM burned off. If this state continues and the DPF 52 continues to trap PM, then the DPF 52 will eventually become clogged. Accordingly, when the PM has accumulated over a certain level, the DPF 52 is regenerated as the exhaust gas temperature is raised and the accumulated PM is forcibly burned off to eliminate the accumulated PM.

The differential pressure sensor 61 is configured and arranged to detect a pressure loss (pressure drop) between the upstream chamber 51a (entrance of the DPF 52) and the downstream chamber 51b (exit of the DPF 52) of the DPF housing 51. Then, the differential pressure sensor 61 is configured and arranged to output a differential pressure signal to the controller 70.

The DPF inlet temperature sensor 62 is configured and arranged to detect an inlet temperature $T_{in}$ of the DPF 52. Then, the DPF inlet temperature sensor 62 is configured to output an inlet temperature signal to the controller 70.

The DPF outlet temperature sensor 63 is configured to detect an outlet temperature $T_{out}$ of the DPF 52. Then, the DPF outlet temperature sensor 63 is configured and arranged to output an outlet temperature signal to the controller 70.

The crank angle sensor 64 is configured to detect a rotational speed of the crank shaft 11 of the diesel engine 10. Then, the crank angle sensor 64 is configured and arranged to output a crank angle signal to the controller 70.

The controller 70 preferably includes a microcomputer with a DPF regeneration control program that controls the regeneration control of the DPF 52 as discussed below. The controller 70 can also include other conventional components such as an input interface circuit, an output interface circuit, and storage devices such as a ROM (Read Only Memory) device and a RAM (Random Access Memory) device. The microcomputer of the controller 70 is programmed to control the engine 10 and other components of the engine 10. The memory circuit stores processing results and control programs such as ones for the PM accumulation amount calculation operation that are run by the processor circuit. The controller 70 is operatively coupled to the various components of the engine 10 in a conventional manner. The internal RAM of the controller 70 stores statuses of operational flags and various control data. The internal ROM of the controller 70 stores data for various operations. The controller 70 is capable of selectively controlling any of the components of the control system in accordance with the control program. It will be apparent to those skilled in the art from this disclosure that the precise structure and algorithms for the controller 70 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The controller 70 is configured to receive the differential pressure signal outputted from the differential pressure sensor 61 and to estimate a PM accumulation amount $M_{pm}$ of the DPF 52 based on the magnitude of the differential pressure and the accumulation state of ash as explained in more detail below. Moreover, the controller 70 is configured to estimate the DPF regeneration timing based on the PM accumulation amount $M_{pm}$. The controller 70 is further configured to receive input the inlet temperature signal outputted from the DPF inlet temperature sensor 62 and the outlet temperature signal outputted from the DPF outlet temperature sensor 63. Based on the inlet and outlet temperature signals, the controller 70 is configured to calculate the bed temperature of the DPF 52. The controller 70 is then configured to determine the optimal gear shift step (gear ratio) based on the engine operating state, and to calculate the travel distance in accordance with the crank angle signal outputted from the crank angle sensor 64.

In addition, the controller 70 is configured to adjust the amount of fuel injected and the injection timing by controlling the injector 12 and the high pressure pump 14 based on the input signals from various sensors. The controller 70 is configured to adjust the opening degree of the throttle valve 22 based on the input signals from various sensors. The controller 70 is further configured to control the duty cycle of the EGR valve 33. The controller 70 is configured to perform a regeneration control of the DPF 52 by controlling the injector 12, the high pressure pump 14, the throttle valve 22, and the EGR valve 33 to adjust the excess air ratio (air fuel ratio) (using λ control) and to modify the unburned components (hydrocarbons, HC) contained in the exhaust gas, thereby raising the temperature of the exhaust gas that flows out from the DOC 40.

Figure 6:
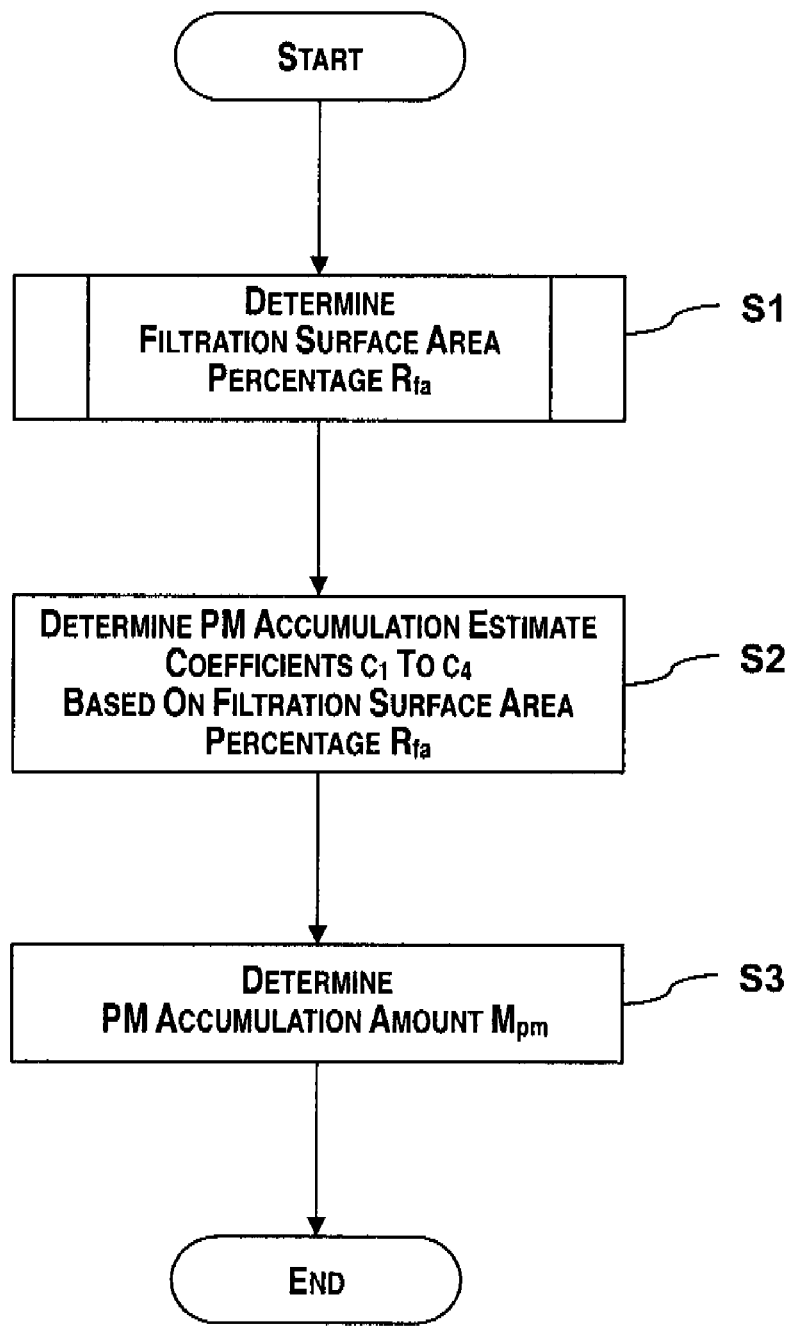
FIG. 6 is a flowchart illustrating a main control flow executed in the particulate matter accumulation amount detection apparatus in accordance with the first embodiment of the present invention.

Referring now to the flowchart of FIG. 6, an operation of the particulate accumulation amount detection apparatus according to the first embodiment will be described in detail. The controller 70 constitutes main part of the particulate accumulation amount detection apparatus of the DPF 52. FIG. 6 is a flowchart illustrating a main control routine executed by the particulate accumulation amount detection apparatus (principally, the controller 70) of the DPF 52. The controller 70 is preferably configured to repeat the execution of the process shown in the flowchart of FIG. 6 every prescribed time period (e.g., every 10 ms).

In step S1, the controller 70 is configured to calculate the filtration surface area percentage $R_{fa}$. The specific calculating method of the filtration surface area percentage $R_{fa}$ executed in step S1 is discussed later with reference to FIG. 8.

Figure 7:
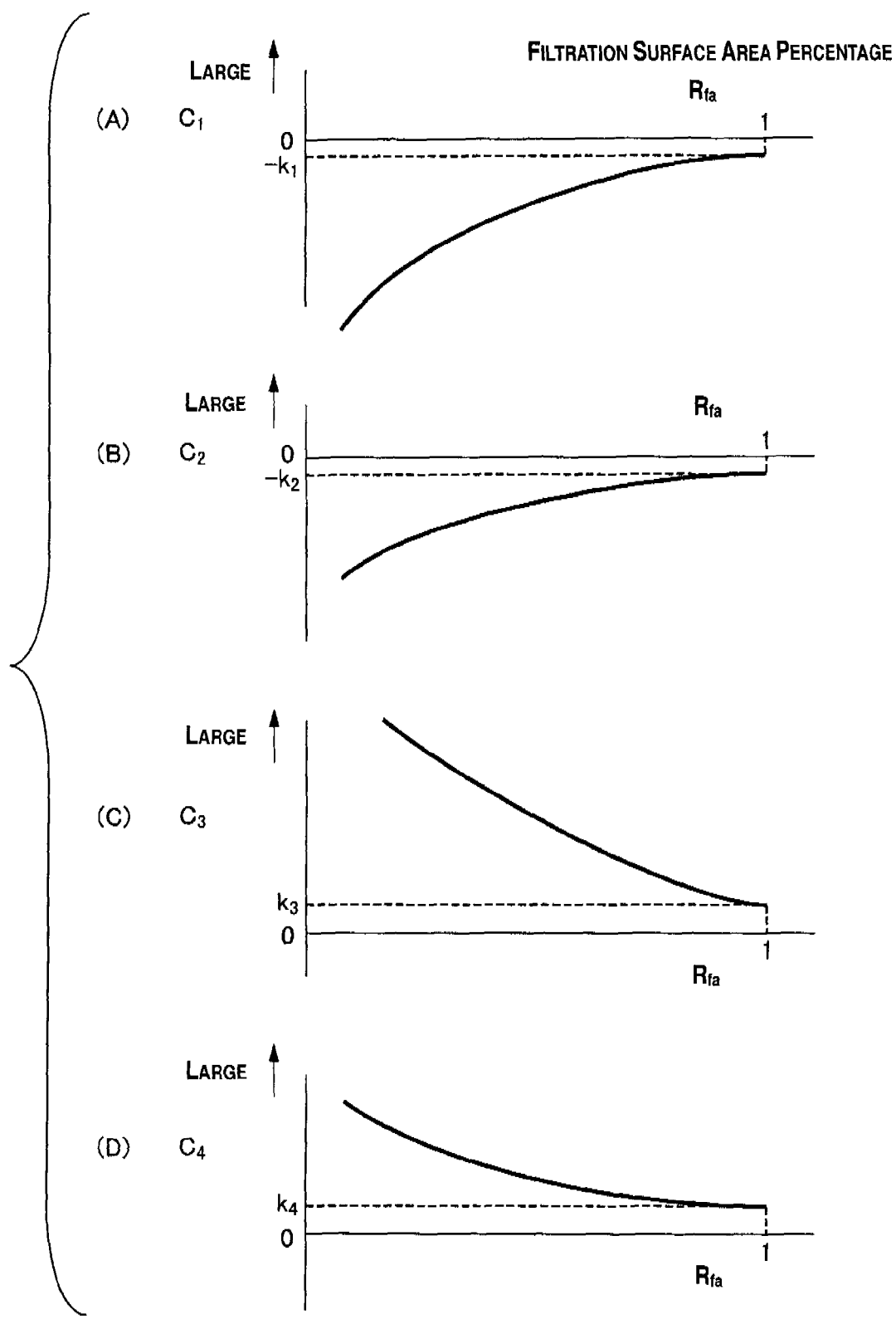
FIG. 7 is a series of characteristics maps (A) to (D) for determining first to forth PM accumulation estimate coefficients based on a filtration surface area percentage in accordance with the first embodiment of the present invention.

In step S2, the controller 70 is configured to determine first to fourth PM accumulation estimate coefficients $c_1$ to $c_4$ by applying the filtration surface area percentage $R_{fa}$ to a characteristics map such as the one shown in FIG. 7. The characteristics map shown in FIG. 7 is preferably empirically set and stored in advance in ROM of the controller 70. As shown in FIG. 7, the controller 70 is configured to adjust the first to fourth coefficients $c_1$ to $c_4$ such that the first and second coefficients $c_1$ and $c_2$ continuously increase as the filtration surface area percentage $R_{fa}$ increases, and the third and fourth coefficients $c_3$ and $c_4$ continuously decrease as the filtration surface area percentage $R_{fa}$ increases.

In step S3, the controller 70 is configured to calculate the PM accumulation amount $M_{pm}$ based on the equation (5) below.

$$M_{pm} = \frac{\Delta P + c_1 \mu Q + c_2 \rho Q^2}{c_3 \mu Q + c_4 \rho Q^2} \qquad \text{Equation (5)}$$

$M_{pm}$: PM accumulation amount
$\Delta P$: Pressure loss
Q: Gas flow volume
$\mu$: Exhaust gas viscosity
$\rho$: Exhaust gas density
$c_1$, $c_2$, $c_3$, $c_4$: PM accumulation estimate coefficients The control processing executed by the controller 70 in steps S2 and S3 corresponds to the particulate accumulation amount detecting section of the present invention.

Figure 8:
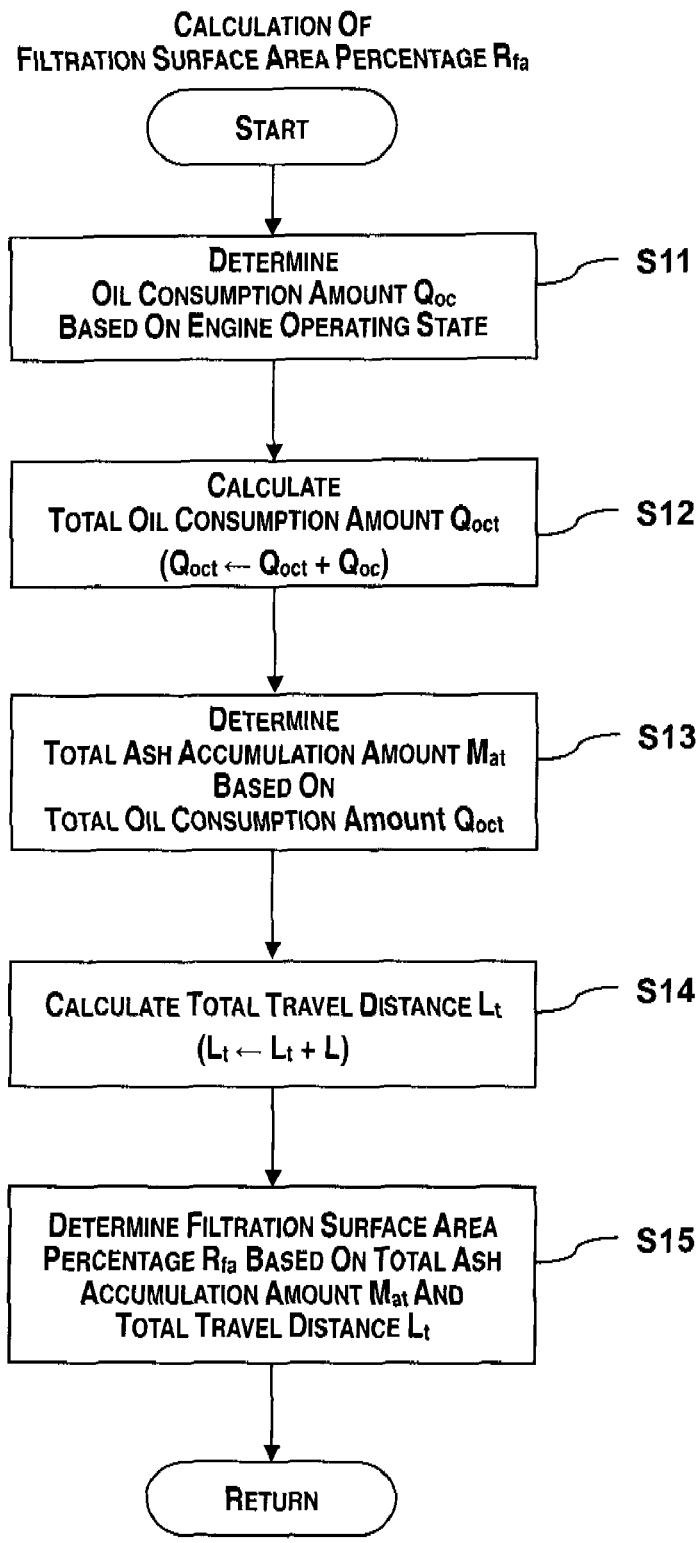
FIG. 8 is a flowchart illustrating a filtration surface area percentage calculation routine executed in the particulate matter accumulation amount detection apparatus in accordance with the first embodiment of the present invention.

FIG. 8 is a flowchart that shows details of a filtration surface area percentage calculation routine executed in step S1 of FIG. 6 in accordance the first embodiment of the present invention.

Figure 9:
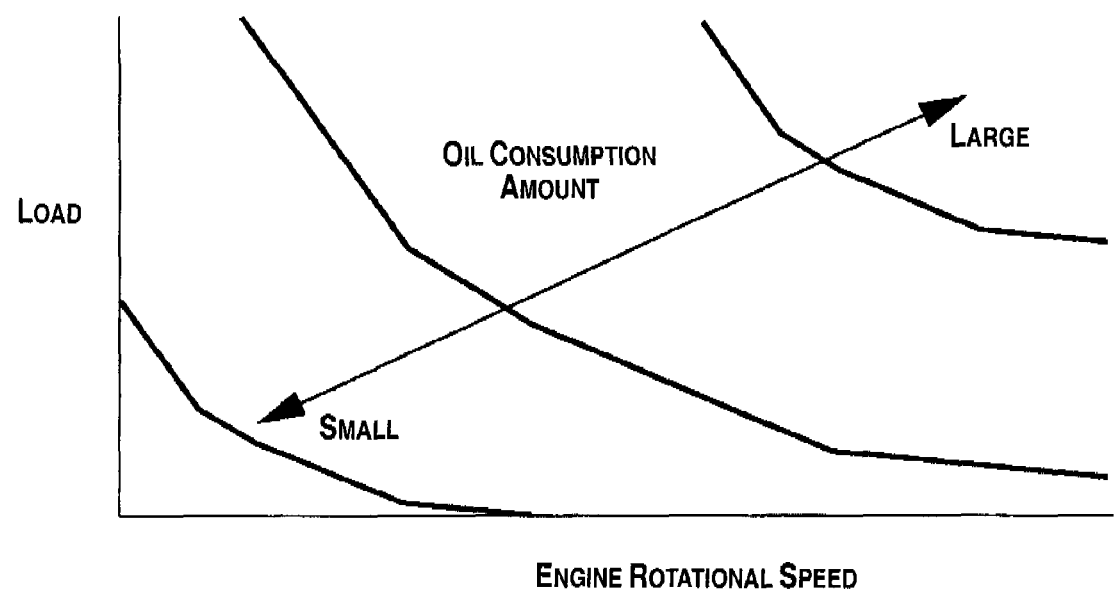
FIG. 9 is a characteristics map for determining an oil consumption amount based on an engine operating state including an engine rotational speed and an engine load in accordance with the first embodiment of the present invention.

In step S11, the controller 70 is configured to determine an oil consumption amount $Q_{oc}$ by applying the engine operating state (i.e., engine rotational speed and load) to a characteristics map such as the one shown in FIG. 9. The characteristics map shown in FIG. 9 is preferably empirically set and stored in advance in ROM of the controller 70.

In step S12, the controller 70 is configured to calculate a total oil consumption amount $Q_{oct}$ up to the present cycle by adding the oil consumption amount $Q_{oc}$ determine in step S11 in the present cycle to the total oil consumption amount $Q_{oct}$ calculated in the previous cycle.

Figure 10:
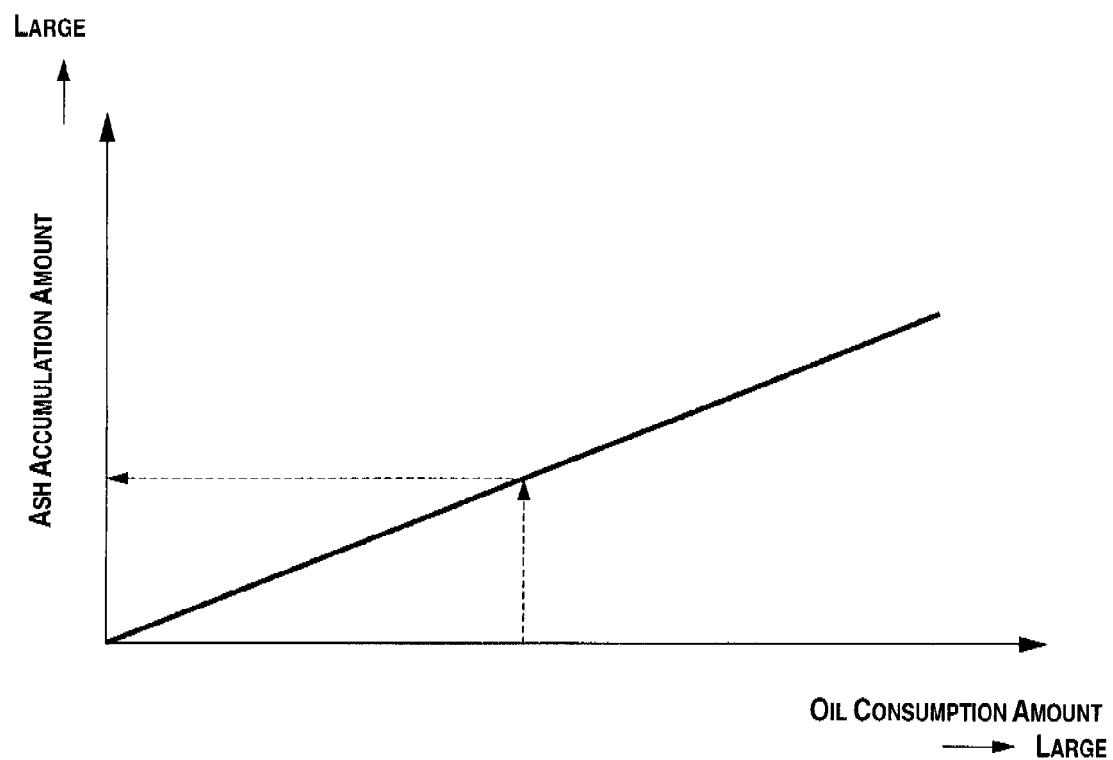
FIG. 10 is a characteristics map for determining a total ash accumulation amount accumulated in the DPF based on a total oil consumption amount in accordance with the first embodiment of the present invention.

In step S13, the controller 70 is configured to determine a total ash accumulation amount $M_{at}$ by applying the total oil consumption amount $Q_{oct}$ up to the present cycle to a characteristics map such as the one shown in FIG. 10. The total ash accumulation amount $M_{at}$ indicates the total amount of ash that is estimated to have been discharged by the engine 10 and accumulated in the DPF 52. The characteristics map shown in FIG. 10 is preferably empirically set and stored in advance in ROM of the controller 70. The control process executed in step S13 by the controller 70 corresponds to the incombustible component amount estimating section of the present invention.

In step S14, the controller 70 is configured to determine a total travel distance $L_t$ (cumulative travel distance) up to the present cycle by adding a travel distance L in the present cycle to the total travel distance $L_t$ in the previous cycle.

Figure 11:
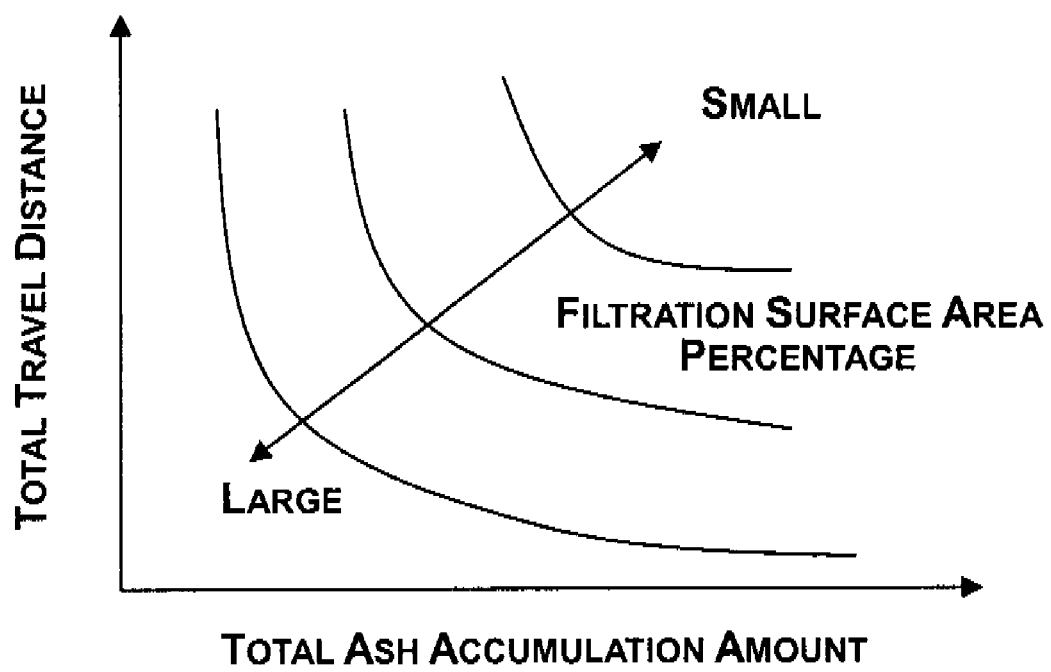
FIG. 11 is a characteristics map for determining the filtration surface area percentage based on the total ash accumulation amount and a total travel distance in accordance with the first embodiment of the present invention.

In step S15, the controller 70 is configured to determine the filtration surface area percentage $R_{fa}$ of the DPF 52 by applying the total ash accumulation amount $M_{at}$ and the total travel distance $L_t$ to a characteristics map such as the one shown in FIG. 11. The characteristics map shown in FIG. 11 is preferably empirically set and stored in advance in ROM of the controller 70. The control process executed in step S15 by the controller 70 corresponds to the incombustible component accumulation state estimating section of the present invention.

For example, when the total travel distance $L_t$ varies, then the longer the total travel distance $L_t$ is, the more predominant that high speed operation becomes. Therefore, even if the total ash accumulation amount $M_{at}$ is the same, the ash accumulation state in the DPF 52 varies depending on the total travel distance $L_t$. Thus, as shown in the map of FIG. 11, the filtration surface area percentage $R_{fa}$ is smaller when the high speed travel is predominant (when the total travel distance $L_t$ is longer) than when the normal travel is predominant (when the total travel distance $L_t$ is shorter).

Moreover, for example, even when the total travel distance $L_t$ is the same, if the total ash accumulation amount $M_{at}$ varies, then the greater the total ash accumulation amount $M_{at}$ is, the more predominant the high speed operation becomes. Thus, as shown in the map of FIG. 11, the filtration surface area percentage $R_{fa}$ is smaller when the high speed travel is predominant (when the total ash accumulation amount $M_{at}$ is larger) than when normal travel is predominant (when the total ash accumulation amount $M_{at}$ is smaller).

Accordingly, according to the map shown in FIG. 11, the filtration surface area percentage $R_{fa}$ is determined based on the relationship between the total travel distance $L_t$ and the total ash accumulation amount Mat. Therefore, it is possible to accurately estimate the PM accumulation amount by taking into consideration the state of the accumulation of ash (e.g., the wall surface accumulation or the bottom part accumulation) on the thin walls 52a of the DPF 52 (FIGS. 1 to 3).

Figure 12:
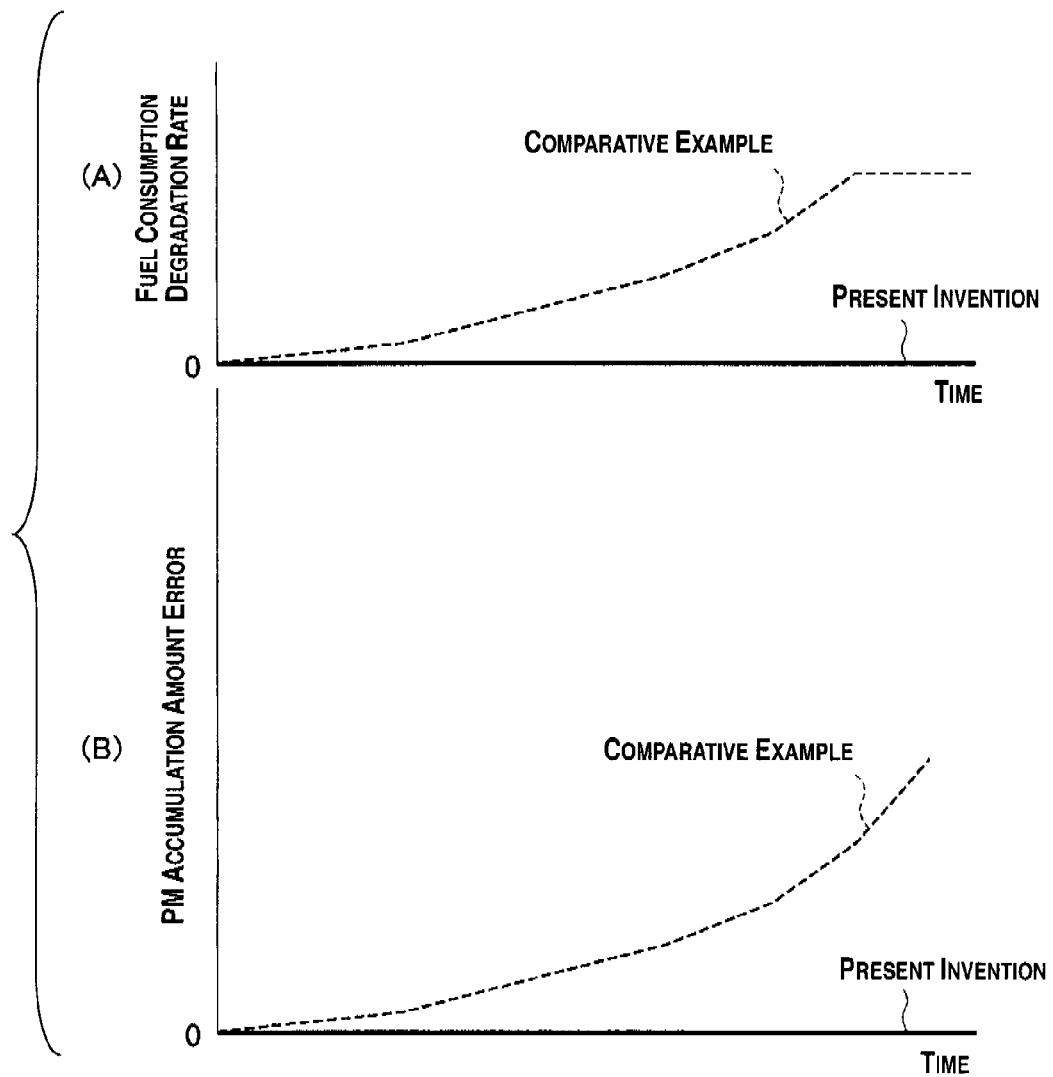
FIG. 12 is a pair of schematic diagrams (A) and (B) illustrating the effects of the first embodiment of the present invention with respect to a comparative example.

FIG. 12 is a pair of schematic diagrams (A) and (B) illustrating the effect of the first embodiment of the present invention with respect to a comparative example in which the PM accumulation amount is estimated in the conventional method. In the diagrams (A) and (B) of FIG. 12, the x-axis represents time.

In the comparative example, the amount of PM accumulated in the DPF may not be accurately estimated depending on the engine operating state. More specifically, in the comparative example, the amount of PM accumulated in the DPF tends to be estimated as being greater than an actual amount of PM accumulated in the DPF as shown in the broken line in the diagram (B) of FIG. 12. Thus, since the DPF regeneration control is initiated based on such an overestimated PM accumulation amount, the DPF regeneration control is started and post injection is performed when it is not necessary. Accordingly, in the comparative example, the fuel economy degrades over time as shown in the broken line in the diagram (A) of FIG. 12.

On the other hand, in the present invention, the filtration surface area percentage $R_{fa}$ is taken into consideration when the PM accumulation amount $M_{pm}$ is calculated. More specifically, as the ash clogged on the surface area of the DPF 52 increases (i.e., the area of the porous thin walls 52a through which the exhaust gas can no longer pass due to the accumulation of ash in the DPF 52 increases), the DPF pressure loss $\Delta P$ increases. Moreover, the ash accumulation state varies in accordance with the engine operating state, i.e., the ash clogged surface area varies even if the amount of ash that is discharged from the engine 10 remains the same.

Accordingly, in estimating the PM accumulation amount $M_{pm}$, the present invention takes into consideration a physical quantity (i.e., the filtration surface area percentage $R_{fa}$) which indicates the percentage of the surface area in the DPF 52 that is not clogged by ash and therefore allows the exhaust gas to pass through to filter PM in the exhaust gas. More specifically, the PM accumulation amount $M_{pm}$ is calculated such that the lower the filtration surface area percentage $R_{fa}$ (i.e., the more that the clogged surface area spreads due to ash) is, the lower the PM accumulation amount $M_{pm}$ becomes.

Therefore, it is possible to accurately determine the PM accumulation amount $M_{pm}$ in the present invention as shown by the solid line in the diagram (B) of FIG. 12. Furthermore, because the DPF regeneration control is executed based on the accurately estimated PM accumulation amount, it is possible to limit post injection only to when it is necessary, and to prevent a degradation in fuel economy as shown in the solid line in the diagram (A) of FIG. 12.

Second Embodiment

Figure 13:
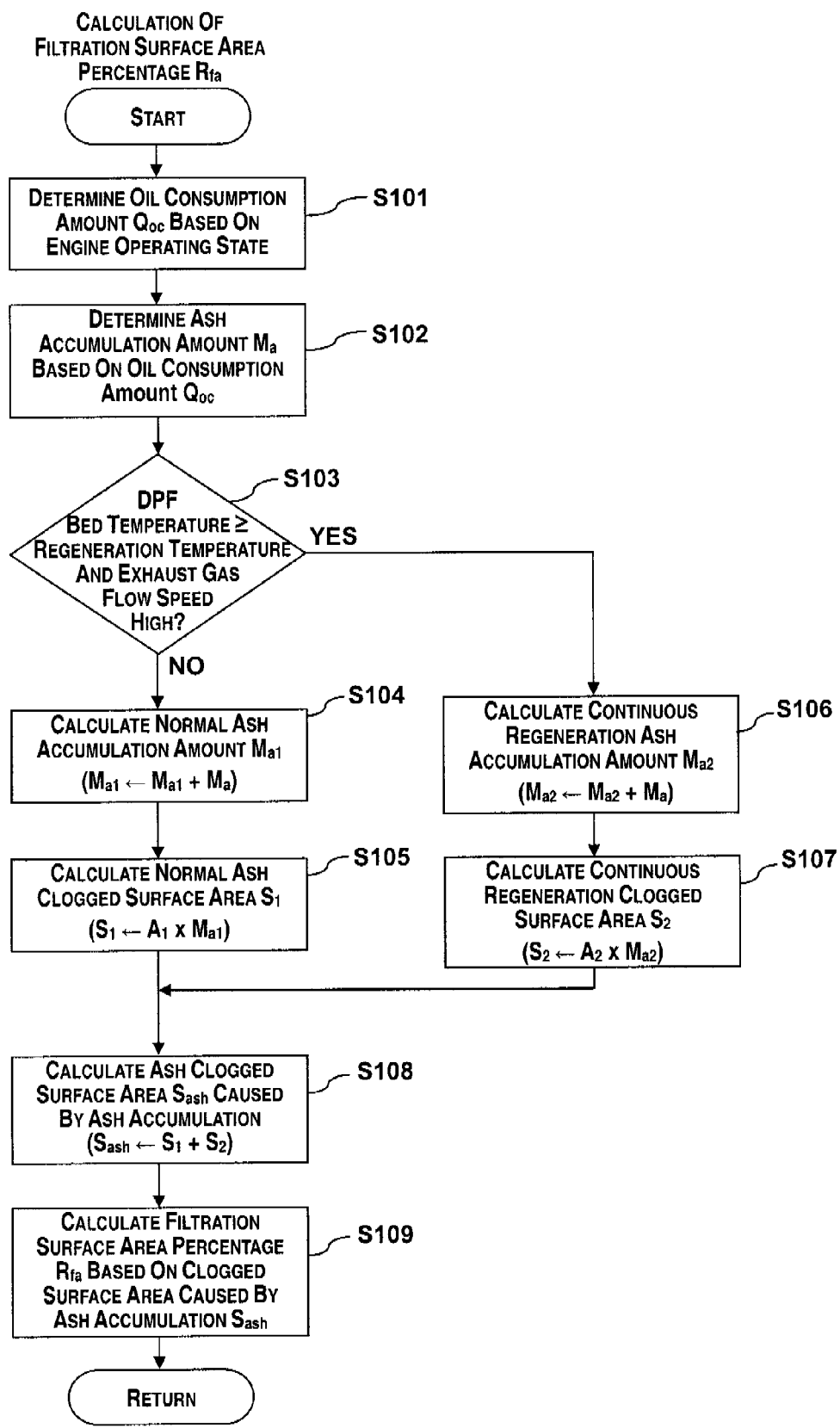
FIG. 13 is a flowchart illustrating a filtration surface area percentage calculation routine executed in the particulate matter accumulation amount detection apparatus in accordance with a second embodiment of the present invention.

Referring now to FIG. 13, a particulate matter accumulation amount detection apparatus and method in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The second embodiment of the present invention only differs from the first embodiment in that the controller 70 (FIG. 5) is configured to execute calculation of the filtration surface area percentage $R_{fa}$ in step S1 of FIG. 6 in accordance with a flowchart illustrated in FIG. 13 instead of the flowchart of FIG. 8. More specifically, with the first embodiment discussed above, the controller 70 is configured to determine the filtration surface area percentage $R_{fa}$ based on the total ash accumulation amount $M_{at}$ and the total travel distance $L_t$ as shown in FIG. 11. On the other hand, in the second embodiment, the controller 70 is configured to determine the filtration surface area percentage $R_{fa}$ by specifically calculating an ash clogged surface area $S_{ash}$.

The control process for calculating the filtration surface area percentage $R_{fa}$ in accordance with the second embodiment will be explained with reference to the flowchart of FIG. 13.

In step S101, the controller 70 is configured to determine the oil consumption amount $Q_{oc}$ based on the engine operating state (engine rotational speed and load). More specifically, similarly to step S11 of FIG. 8 in the first embodiment, the controller 70 is configured to determine the oil consumption amount $Q_{oc}$ by applying the engine operating state (engine rotational speed and load) to the characteristics map such as the one shown in FIG. 9. As mentioned above, the characteristics map shown in FIG. 9 is preferably empirically set and stored in advance in ROM of the controller 70.

In step S102, the controller 70 is configured to determine an ash accumulation amount $M_a$ that indicates an estimated amount of ash discharged from the engine 10 and accumulated in the DPF 52 based on the oil consumption amount $Q_{oc}$. More specifically the controller 70 is configured to determine the ash accumulation amount $M_a$ by applying the oil consumption amount $Q_{oc}$ determined in step S101 to the characteristics map such as the one shown in FIG. 10. As mentioned above, the characteristics map shown in FIG. 10 is preferably empirically set and stored in advance in ROM of the controller 70. The control process executed in step S102 by the controller 70 corresponds to the incombustible component amount estimating section of the present invention.

Next, the controller 70 is configured to determine whether the engine operating state during travel corresponds to a continuous regeneration condition or a normal travel condition. More specifically, in step S103, the controller 70 is configured to determine whether the DPF bed temperature is greater than or equal to a prescribed regeneration temperature and the exhaust gas flow speed is high (e.g., higher than a prescribed speed). The controller 70 is preferably configured to determine the exhaust gas flow speed based on the rotational speed and the load of the engine 10. When the DPF bed temperature is greater than or equal to the prescribed regeneration temperature and the exhaust gas flow speed is high, the engine 10 is operating under high speed travel condition and the DPF 52 transitions to a state in which the DPF 52 regenerates naturally (the continuous regeneration condition). Thus, when the DPF bed temperature is greater than or equal to the prescribed regeneration temperature and the exhaust gas flow speed is high (Yes in step S103), then the controller 70 proceeds to step S106. Otherwise, the controller 70 determines that the engine 10 is operating under the normal travel condition (No in step S103), and thus, the controller 70 proceeds to step S104.

In step S104, the controller 70 is configured to calculate a normal ash accumulation amount $M_{a1}$ by adding the ash amount $M_a$ determined in step S102 to a previous value of the normal ash accumulation amount $M_{a1}$.

In step S105, the controller 70 is configured to calculate a normal ash clogged surface area $S_1$ by multiplying the normal ash accumulation amount $M_{a1}$ by a first surface area conversion coefficient $A_1$. The first surface area conversion coefficient $A_1$ is preferably a prescribed value.

In step S106, the controller 70 is configured to calculate a continuous regeneration ash accumulation amount $M_{a2}$ indicating the ash accumulation amount during continuous regeneration by adding the ash amount $M_a$ determined in step S102 to a previous value of the continuous regeneration ash accumulation amount $M_{a2}$.

In step S107, the controller 70 is configured to calculate a continuous regeneration ash clogged surface area $S_2$ by multiplying the continuous regeneration ash accumulation amount $M_{a2}$ by a second surface area conversion coefficient $A_2$. The second surface area conversion coefficient $A_2$ is preferably a prescribed value that is larger than the first surface area conversion coefficient $A_1$ used in step S105.

In step S108, the controller 70 is configured to calculate the ash accumulation clogged surface area $S_{ash}$ indicating the clogged surface area caused by ash accumulation by adding the normal ash clogged surface area $S_1$ and the continuous regeneration ash clogged surface area $S_2$.

In step S109, the controller 70 is configured to determine the filtration surface area percentage $R_{fa}$ based on the equation (6) below.

$$R_{fa} = \frac{S_0 - S_{ash}}{S_0} \quad \text{Equation (6)}$$

$R_{fa}$: Filtration surface area percentage
$S_0$: Filtration surface area when the DPF is brand new
$S_{ash}$: Ash accumulation clogged surface area The control process executed in step S109 by the controller 70 corresponds to the incombustible component accumulation state estimating section of the present invention.

Accordingly, in the second embodiment of the present invention, the filtration surface area percentage $R_{fa}$ is calculated without using the characteristics map as shown in FIG. 11 as in the first embodiment. Thus, in the second embodiment, it is not necessary to prepare the characteristics map as shown in FIG. 11. Therefore, the number of adaptable processes in calculating the filtration surface area percentage $R_{fa}$ can be reduced, The controller 70 is configured to determine the filtration surface area percentage $R_{fa}$ in accordance with whether the engine operating state during travel corresponds to the continuous regeneration condition or the normal travel condition in the second embodiment. Therefore, it is possible to accurately estimate the PM accumulation amount $M_{pm}$ while taking the ash accumulation state on the thin walls $52a$ of the DPF 52 into consideration.

Third Embodiment

Figure 14:
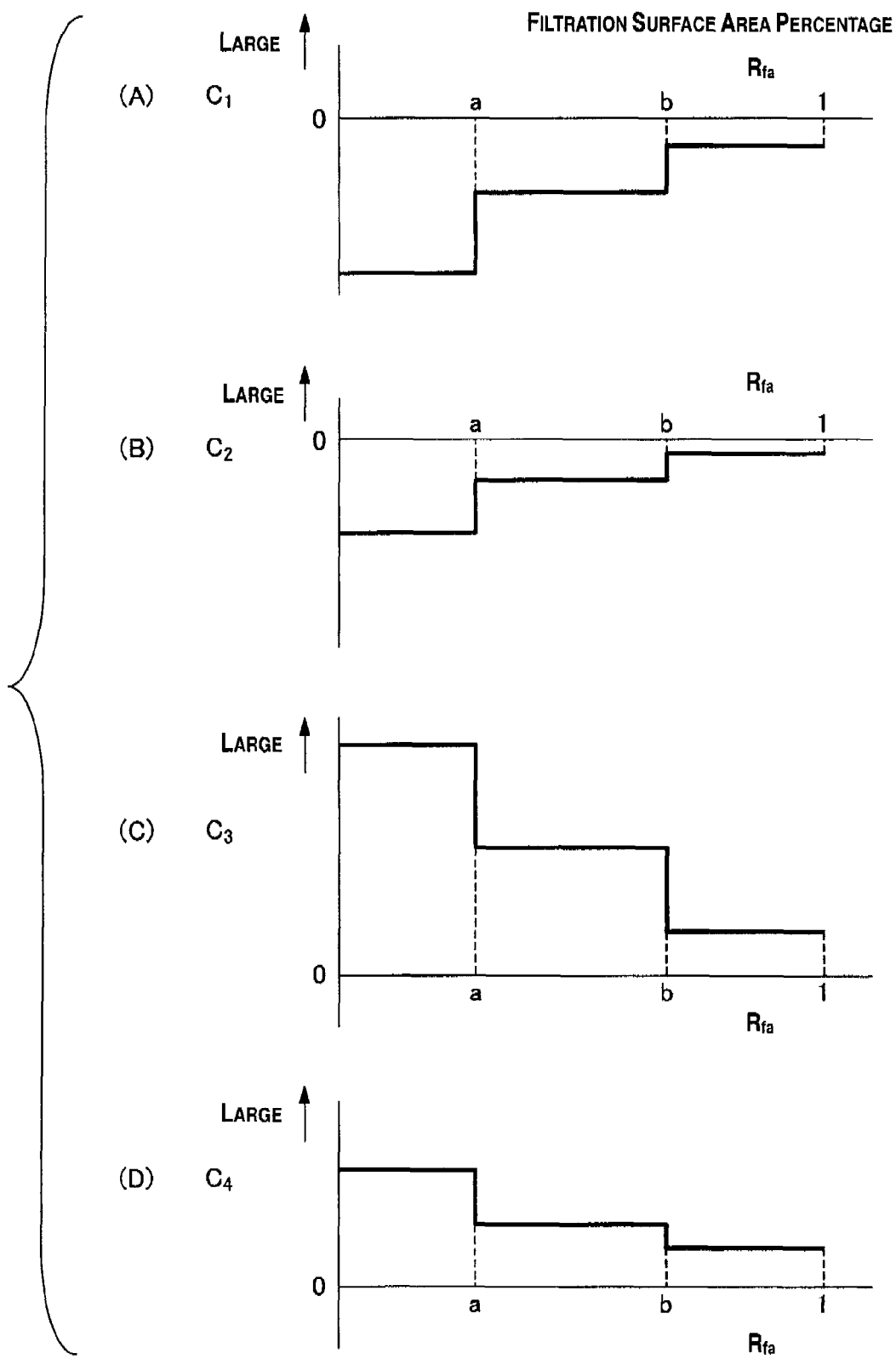
FIG. 14 is a series of characteristics maps (A) to (D) for determining first to forth PM accumulation estimate coefficients based on the filtration surface area percentage in accordance with a third embodiment of the present invention.

Referring now to FIG. 14, a particulate matter accumulation amount detection apparatus and method in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The third embodiment of the present invention only differs from the first embodiment in that the controller 70 (FIG. 5) is configured to determine the PM accumulation estimate coefficients $c_1$ to $c_4$ in step S2 of FIG. 6 by referring to a map shown in FIG. 14 instead of the map shown in FIG. 7. More specifically, in the first and second embodiments described above, the PM accumulation estimate coefficients $c_1$ to $c_4$ are set based on the map shown in FIG. 7. In the third embodiment of the present invention, the map shown in FIG. 7 is simplified into the map shown in FIG. 14, and the PM accumulation estimate coefficients $c_1$ to $c_4$ are set based on the map shown in FIG. 14. As shown in FIG. 14, the controller 70 is configured to adjust the first to fourth coefficients $c_1$ to $c_4$ such that the first and second coefficients $c_1$ and $c_2$ increase in stepwise as the filtration surface area percentage $R_{fa}$ increases, and the third and fourth coefficients $c_3$ and $c_4$ decrease in stepwise as the filtration surface area percentage $R_{fa}$ increases.

According to the third embodiment of the present invention, it is possible to simplify the map, and thus, the number of the adaptable processes in calculating the filtration surface area percentage $R_{fa}$ can be further reduced.

Although the first through third embodiments of the present invention are explained above based on the drawings, the specific constitution is not limited to these embodiments and it is understood that variations and modifications may be effected without departing from the spirit and scope of the invention.

For example, the bed temperature of the DPF 52 can be detected by directly attaching a sensor to the DPF 52. In addition, the maps illustrated in FIGS. 7, 9, 10, 11 and 14 are merely examples and should be appropriately set empirically or other appropriate method.

According to the present invention, the PM accumulation amount $M_{pm}$ accumulated in the DPF 52 is detected based on the accumulation state of the amount of ash (incombustible component) on the thin walls $52a$ of the DPF 52. Therefore, the PM accumulation amount $M_{pm}$ can be accurately detected.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A particulate matter accumulation amount detection apparatus comprising:
    a filter pressure loss detecting section configured and arranged to detect an upstream-downstream differential pressure of an exhaust gas purification filter having a plurality of substrate walls that filter particulate matter in exhaust gas from an engine to prevent the particulate matter from being discharged into the atmosphere;
    an incombustible component amount estimating section configured to estimate an amount of an incombustible component included in the exhaust gas;
    an incombustible component accumulation state estimating section configured to estimate an accumulation distributional state of the incombustible component on the substrate walls of the exhaust gas purification filter that is indicative of a wall surface area coverage of the incombustible component covering the substrate wall based on the engine operating state and the amount of the incombustible component estimated in the incombustible component amount estimating section; and
    a particulate accumulation amount detecting section configured to detect an amount of the particulate matter accumulated in the exhaust gas purification filter based on the upstream-downstream differential pressure of the exhaust gas purification filter and the accumulation distributional state of the incombustible component on the substrate walls.

2. The particulate matter accumulation amount detection apparatus as recited in claim 1, wherein
the incombustible component accumulation state estimating section is further configured to estimate the accumulation distributional state of the incombustible component on the substrate walls based on the engine operating state including an oil consumption amount and a travel distance.

3. The particulate matter accumulation amount detection apparatus as recited in claim 1, wherein
the incombustible component accumulation state estimating section is further configured to estimate the accumulation distributional state of the incombustible component such that a percentage of a surface area of the substrate walls on which the incombustible component is accumulated is greater when a temperature of the exhaust gas purification filter is equal to or greater than a regeneration temperature than when the temperature of the exhaust gas purification filter is less than the regeneration temperature.

4. The particulate matter accumulation amount detection apparatus as recited in claim 1, wherein
the incombustible component accumulation state estimating section is configured to estimate the accumulation distributional state of the incombustible component such that a percentage of a surface area of the substrate walls on which the incombustible component is accumulated is greater when a flow speed of the exhaust gas passing through the exhaust gas purification filter is equal to or greater than a prescribed speed than when the flow speed of the exhaust gas is less than the prescribed speed.

5. The particulate matter accumulation amount detection apparatus as recited in claim 1, wherein
the incombustible component accumulation state estimating section is further configured to determine a filtration surface area percentage indicative of a percentage of a surface area of the substrate walls that is not clogged by the incombustible component determined based on the accumulation distributional state of the incombustible component, and
the particulate accumulation amount detecting section is configured to calculate the amount of the particulate matter accumulated in the exhaust gas purification filter as follows:

$$M_{pm} = \frac{\Delta P + c_1 \mu Q + c_2 \rho Q^2}{c_3 \mu Q + c_4 \rho Q^2}$$

where
$M_{pm}$ is the amount of the particulate matter accumulated in the exhaust gas purification filter,
$\Delta P$ is the upstream-downstream differential pressure of the exhaust gas purification filter,
$Q$ is a gas flow volume,
$\mu$ is an exhaust gas viscosity,
$\rho$ is an exhaust gas density, and
$c_1$, $c_2$, $c_3$ and $c_4$ are first through fourth coefficients, respectively, determined based on the filtration surface area percentage.

6. The particulate matter accumulation amount detection apparatus as recited in claim 5, wherein
the particulate accumulation amount detecting section is configured to adjust the first to fourth coefficients $c_1$ to $c_4$ such that
the first and second coefficients $c_1$ and $c_2$ continuously increase as the filtration surface area percentage increases, and
the third and fourth coefficients $c_3$ and $c_4$ continuously decrease as the filtration surface area percentage increases.

7. The particulate matter accumulation amount detection apparatus as recited in claim 5, wherein
the particulate accumulation amount detecting section is configured to adjust the first to fourth coefficients $c_1$ to $c_4$ such that
the first and second coefficients $c_1$ and $c_2$ increase in stepwise as the filtration surface area percentage increases, and
the third and fourth coefficients $c_3$ and $c_4$ decrease in stepwise as the filtration surface area percentage increases.

8. An exhaust gas system including the particulate matter accumulation amount detection apparatus as recited in claim 1.

9. An engine system including the particulate matter accumulation amount detection apparatus as recited in claim 1.

10. A particulate matter accumulation amount detection apparatus comprising:
filter pressure loss detecting means for detecting an upstream-downstream differential pressure of an exhaust gas purification filter having a plurality of substrate walls that filter particulate matter in exhaust gas from an engine to prevent the particulate matter from being discharged into the atmosphere;
incombustible component amount estimating means for estimating an amount of an incombustible component included in the exhaust gas;
incombustible component accumulation state estimating means for estimating an accumulation distributional state of the incombustible component on the substrate walls of the exhaust gas purification filter that is indicative of a wall surface area coverage of the incombustible component covering the substrate wall based on the engine operating state and the amount of the incombustible component estimated in the incombustible component amount estimating means; and
particulate accumulation amount detecting means for detecting an amount of the particulate matter accumulated in the exhaust gas purification filter based on the upstream-downstream differential pressure of the exhaust gas purification filter and the accumulation distributional state of the incombustible components on the substrate walls.

11. A particulate matter accumulation amount detection apparatus comprising:
filter pressure loss detecting means for detecting an upstream-downstream differential pressure of an exhaust gas purification filter having a plurality of substrate walls that filter particulate matter in exhaust gas from an engine to prevent the particulate matter from being discharged into the atmosphere;
incombustible component amount estimating means for estimating an amount of an incombustible component included in the exhaust gas based on an engine operating state;

incombustible component accumulation state estimating means for estimating a filtration surface area percentage indicative of a percentage of a surface area of the substrate walls that is not clogged by the incombustible component based on a state of the exhaust gas purification filter; and particulate accumulation amount detecting means for detecting an amount of the particulate matter accumulated in the exhaust gas purification filter based on the upstream-downstream differential pressure of the exhaust gas purification filter and the filtration surface area percentage.

12. A particulate matter accumulation amount detection apparatus comprising:

a filter pressure loss detecting section configured and arranged to detect an upstream-downstream differential pressure of an exhaust gas purification filter having a plurality of substrate walls that filter particulate matter in exhaust gas from an engine to prevent the particulate matter from being discharged into the atmosphere;

an incombustible component amount estimating section configured to estimate an amount of an incombustible component included in the exhaust gas;

an incombustible component accumulation state estimating section configured to estimate an accumulation state of the incombustible component on the substrate walls of the exhaust gas purification filter based on the engine operating state and the amount of the incombustible component such that the accumulation state corresponds to a percentage of a surface area of the substrate walls on which the incombustible component has adhered to, with the accumulation state increasing as a travel distance increases for a given amount of the incombustible component estimated in the incombustible component amount estimating section; and a particulate accumulation amount detecting section configured to detect an amount of the particulate matter accumulated in the exhaust gas purification filter based on the upstream-downstream differential pressure of the exhaust gas purification filter and the accumulation state of the incombustible component on the substrate walls.

13. A particulate matter accumulation amount detection apparatus comprising:

a filter pressure loss detecting section configured and arranged to detect an upstream-downstream differential pressure of an exhaust gas purification filter having a plurality of substrate walls that filter particulate matter in exhaust gas from an engine to prevent the particulate matter from being discharged into the atmosphere;

an incombustible component amount estimating section configured to estimate an amount of an incombustible component included in the exhaust gas;

an incombustible component accumulation state estimating section configured to estimate an accumulation state of the incombustible component on the substrate walls of the exhaust gas purification filter based on the engine operating state and the amount of the incombustible component estimated in the incombustible component amount estimating section, wherein the incombustible component accumulation state estimating section is configured to estimate the accumulation state of the incombustible component such that a percentage of a surface area of the substrate walls on which the incombustible component is accumulated is greater when a temperature of the exhaust gas purification filter is equal to or greater than a regeneration temperature than when the temperature of the exhaust gas purification filter is less than the regeneration temperature; and a particulate accumulation amount detecting section configured to detect an amount of the particulate matter accumulated in the exhaust gas purification filter based on the upstream-downstream differential pressure of the exhaust gas purification filter and the accumulation state of the incombustible component on the substrate walls.

14. A particulate matter accumulation amount detection apparatus comprising:

a filter pressure loss detecting section configured and arranged to detect an upstream-downstream differential pressure of an exhaust gas purification filter having a plurality of substrate walls that filter particulate matter in exhaust gas from an engine to prevent the particulate matter from being discharged into the atmosphere;

an incombustible component amount estimating section configured to estimate an amount of an incombustible component included in the exhaust gas;

an incombustible component accumulation state estimating section configured to estimate an accumulation state of the incombustible component on the substrate walls of the exhaust gas purification filter based on the engine operating state and the amount of the incombustible component estimated in the incombustible component amount estimating section, wherein the incombustible component accumulation state estimating section is configured to estimate the accumulation state of the incombustible component such that a percentage of a surface area of the substrate walls on which the incombustible component is accumulated is greater when a flow speed of the exhaust gas passing through the exhaust gas purification filter is equal to or greater than a prescribed speed than when the flow speed of the exhaust gas is less than the prescribed speed; and a particulate accumulation amount detecting section configured to detect an amount of the particulate matter accumulated in the exhaust gas purification filter based on the upstream-downstream differential pressure of the exhaust gas purification filter and the accumulation state of the incombustible component on the substrate walls.

* * * * *